United States Patent [19]
Solano et al.

[11] Patent Number: 5,098,214
[45] Date of Patent: Mar. 24, 1992

[54] ADJUSTABLE SPLICING DEVICE

[75] Inventors: Victorino Solano, Sant Cugat del Valles; Antonio Trilla, Barcelona, both of Spain

[73] Assignee: Pujol Y Tarrago S.A., Rubi, Spain

[21] Appl. No.: 505,705

[22] Filed: Apr. 5, 1990

[30] Foreign Application Priority Data

Apr. 10, 1989 [ES] Spain .................................. 8901238

[51] Int. Cl.⁵ ............................................. B65D 59/00
[52] U.S. Cl. .................................... 403/12; 403/197; 403/194; 74/500.5
[58] Field of Search .......................... 403/197, 194, 12; 74/502.4, 501 R, 500.5; 464/52, 53

[56] References Cited

U.S. PATENT DOCUMENTS

| | | | |
|---|---|---|---|
| 3,602,009 | 8/1971 | Powell | 464/52 |
| 3,839,882 | 10/1974 | Gilarski, Jr. | 464/52 X |
| 4,773,279 | 9/1988 | Spease | 403/197 X |
| 4,798,100 | 1/1989 | Baumgarten | 74/502.4 X |

Primary Examiner—Andrew V. Kundrat
Attorney, Agent, or Firm—Michael J. Striker

[57] ABSTRACT

An adjustable splicing device for mechanically connecting two portions of a rotating cable formed as an adjustable splicing connector associated with a partition-like support. The device comprises a guide and protection body attachable to the support and a movable adjustment core slidable in the guide and protection body and carrying one of the two portions of the rotating cable. A lock nut retains the adjustment core in the guide and protection body and a cylindrical splicing body retains free ends of both portions of the cable in the adjustment core, and a splicing terminal coupled to the adjustment core, carrying a free end of one of the two portions of the rotating cable.

8 Claims, 4 Drawing Sheets

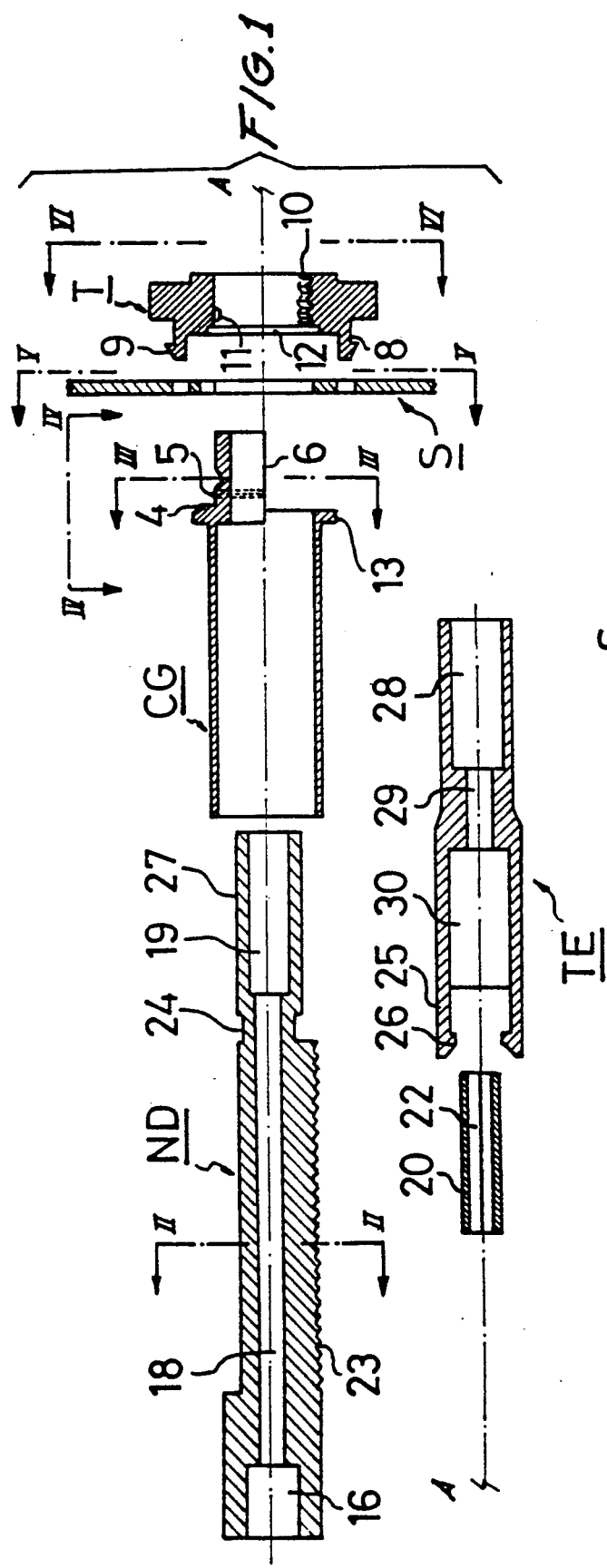
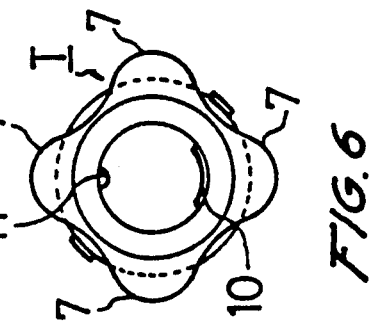
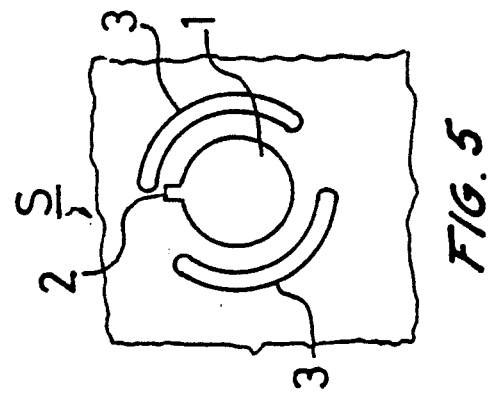
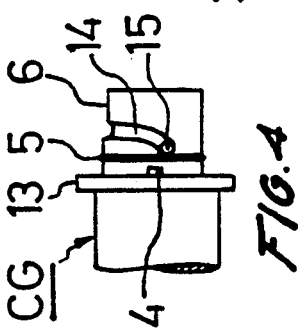
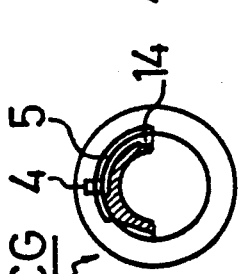
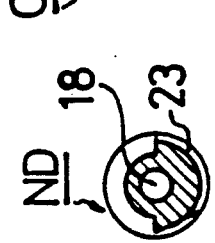

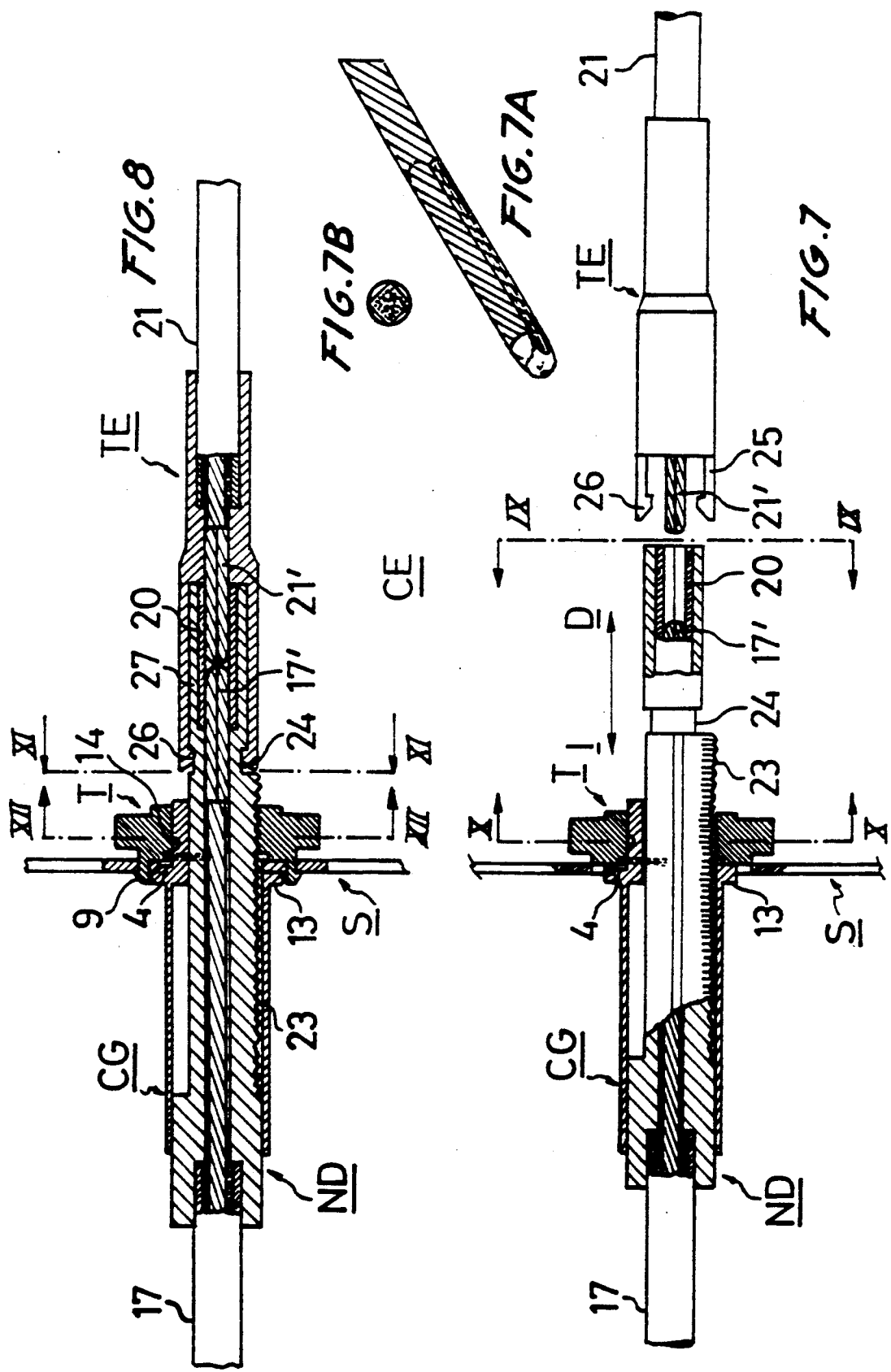

ADJUSTABLE SPLICING DEVICE

FIELD OF THE INVENTION

The present invention relates to an adjustable splicing device of the type applicable to a mechanical connection of portions of rotating sheath cables, and particularly applicable to rotating cables which connect the speed measuring instrument or speedometer mounted on the dashboard of motor vehicles, with corresponding gearbox mechanisms.

BACKGROUND OF THE INVENTION

The use of rotating cables for transmission of movement and having running and protective sheaths, the features of which are adapted in each case to a very broad field of application of such movement transmission means, is well known. Such use arises from the need to establish a connection between an origin of the movement and a receiver or point of application without having recourse to use of rigid couplings. This happens in the particular application mentioned above, i.e., linking the speedometer mounted on the vehicle dashboard with corresponding gearbox mechanisms. Up to date, such connection was effected in the majority of known embodiments by using a single rotating cable both ends of which were provided with appropriate connectors adapted to corresponding coupling means of the speedometer and of the gearbox.

At present, the use of single rotating cables presents an obstacle to improvement of production line assembly processes required by automobile manufacturers because of an increase of the instrumental complexity and assembly of the dashboard. The drawbacks of using a single rotating cable consist particularly in a substantial increase in the length of the rotating cable connecting the gearbox and the dashboard, the existence of obstacles in the cable path or the flexible constitution of the rotating cable itself which require use of a larger number of attachment or anchorage points, making it, furthermore, difficult to adjust the length between the ends, and hindering the connection operations of the corresponding ends with coupling means disposed on the dashboard and on the gearbox, thereby increasing the costs of assembly. Likewise, the current trends concerning the relative position of the vehicle gearbox and dashboard make it hard to produce paths for the rotating connection cable due to the working conditions to which it is subjected.

SUMMARY OF THE INVENTION

To solve the problems raised by the substantial increase of length and/or by the tortuous path that the rotating splicing cables have to follow between the vehicle gearbox and dashboard, and to rationalize the cable assembly operations by adaptation to the currently used manufacturing methods and processes, according to the invention, there is provided an adjustable splicing device which allows the respective mechanisms to be connected together by two portions or lengths of rotating cable, which may be mounted separately in the vehicle during respective different operational stages, to be spliced together subsequently. A further advantage derived from the invention is to be found in the fact that after assembly of one of the cable portions, it allows this to be inaccessible behind a wall, partition or sheet, leaving only accessible the coupling means of the splicing device extending from the other side of the wall. A further advantage of a splicing device according to the invention is a possibility of using the same when it is necessary to pass through a wall, partition or sheet of the vehicle in which through holes may be made, but in which it is not possible to cut gaps, notches or openings of any type extending to the free edge of the wall, partition or sheet. And finally, a further advantage of the splicing device according to the invention consists in a possibility to adjust the length of the cable between certain maximum and minimum limits when splicing the two ends of the rotating cable, whereby the slight differences versus the ideal theoretical length, which more or less normally occur in the assembly of each vehicle may by compensated, thereby avoiding excessively sharp bends caused by an excess cable length or otherwise, mechanically harmful tensions because of the cable is short.

The adjustable splicing device of the invention allows the transmission of movement between the vehicle gearbox and the dashboard to be effected by two portions of rotating cable. In this way, by way of an adequate election of the location of the device of the invention, both the drawbacks derived from an excess length and/or derived from the tortuous path of the rotating cable are avoided. At the same time, using of the splicing device according to the invention allows optimization of the installation operations since each of the constituent portions may be incorporated in different stages of the assembly process.

The splicing device according to the invention also allows it to be mounted through a partition which only admits closed perimeter orifices and which would then not be accessible from one of its sides to the other. More particularly, the portion extending between the speedometer and the partition will not be accessible.

The adjustable splicing device of the invention is characterized in that it comprises an adjustable splicing connector associated with a partition-like support attached to the vehicle structure, and where the adjustable splicing connector is formed by a lock nut, a guiding and protection body, a movable adjustment core, connecting means for the ends of the two portions of the rotating cable; and a splicing terminal.

All these items are duly connected together and form a multifunctional unit which fulfills various different functions in accordance with the different stages of use of the device during the successive perfectly differentiated assembly operations.

It is also a feature of the adjustable splicing device of the invention that the support, the perimeter of which has any shape and dimensions usually corresponding in each case to an intended purpose, is made from sheet material, preferably sheet metal and is provided with a through orifice of essentially circular cross-section, with a positioning notch and with two curved slots of equal radius of curvature concentric with the through orifice, with the ends thereof arranged a relatively short distance apart. The through orifice corresponds in dimensions to the outer surface of a guide and protection body so that the latter may pass through and be located therein, and the curved slots mate with the engagement means of the lock nut.

In this way, the positioning notch and the both slots concentric to the through orifice, respectively, contribute to retaining the positions of the guide and protection body, and of the lock nut stable, allowing the remaining components of the adjustable splicing connector to be coupled, when contemplated, by the assembly operators.

The adjustable splicing device is also characterized in that the lock nut, made of a material adapted to the intended use and purpose and, preferably, of plastic material or light alloys, is provided with mechanical hand-tightening means; two fixing and pressure lugs provided with the corresponding teeth; a segmented inner engagement thread; an inner retaining shoulder; and an inner circular channel, with the peculiarity that the inner retaining shoulder, the fixing and pressure lugs and the inner circular channel are disposed at a relatively short distance from one of the sides perpendicular to the longitudinal axis of the lock nut.

The mechanical hand-tightening means preferably consists of wings disposed around the perimeter, knurling or any other means allowing the fitter to manipulate the nut as required during the assembly operations of the device of the invention.

The two fixing and pressure lugs of the lock nut may be inserted in the corresponding slots concentric to the through hole of the support of the adjustable splicing connector and, by way of the teeth with which they are provided, determine a stable position of the lock nut which may also rotate about its axis over the angular interval determined by the length between the ends of the slots.

A further feature of the adjustable splicing device is that the guide and protection body, made from material appropriate for the intended use and purpose and, preferably, of plastic material or light alloys, is provided with a positioning projection for preventing rotation thereof such as an external annular rib for retaining the guide and protection body in position during the intermediate assembly operations prior to fitting of the splicing terminal which secures the connection; a tightening shoulder; and a channelled portion comprising the inner guide and retaining rib which holds the lock nut.

The guide and protection body may be inserted with the end provided with the channelled portion, through the through orifice of the adjustable splicing connector support, the positioning projection thereof engaging in the corresponding notch provided in the support. The guide and protection body is retained in its position by press fitting the external annular rib during the assembly process of the remaining components of the adjustable splicing connector, without the risk of it falling spontaneously out of the through orifice freely and without control behind the wall support.

A further feature of the guide and protection body is that the means for guiding and retaining the inner retaining shoulder of the lock nut, disposed on the outer surface of the channelled portion, is formed by a slot having an appropriate section corresponding to that of the inner retaining shoulder, which slot extends over a sufficient angular distance and is provided with means for retaining the inner retaining shoulder in the final or locked position of the adjustable splicing connector.

The adjustable splicing device of the invention is also characterized in that the movable adjustment core is essentially cylindrical and is made from material appropriate for the intended use and purpose, preferably plastic material or light alloys, and is provided with an internal center through hole which extends along its whole longitudinal axis, through the rear end of which the free end of one of the portions of the rotating cable is inserted, and in the opposite or front end of which there is formed a housing of the connecting means between the two portions of rotating cable; a segmented outer engagement thread the length of which corresponds to the range of adjustment of length allowed by the device, and which is mechanically complemented to be able to lock itself with the segmented inner engagement thread of the lock nut; an external annular channel for retaining the splicing terminal mounted around the free end of the other portion of rotating cable, and a front piece coinciding essentially in length and position with the internal housing area of the said connecting means.

As said above, the free end of one of the two portions of rotating cable penetrates in the above mentioned movable adjustment core to be directed towards the connecting means allowing its mechanical coupling with the free end of the other portion of rotating cable.

The internal through orifice of the movable adjustment core preferably comprises three portions or sections of different diameters having the following purposes: the rear one of them through which one of the portions of the rotating cable is inserted, restricts the entry of this portion of rotating cable inside the movable adjustment core, since the plane determined by the change of section which moves from a greater to a lesser diameter forming a step, forms the retaining seat for the rotating cable sheath. The intermediate section, as said above, is of smaller diameter than the previous one and receives therein the end of the sheathless portion of the cable. The third, the front section situated after the second one and having a shape and dimensions appropriate for housing the connecting means of the ends of the two portions of rotating cable.

A further feature of the adjustable splicing device of the invention is that the connecting means of the ends of the two portions of rotating cable are formed by an essentially cylindrical body made from material appropriate for the intended use and purpose, preferably plastic material, which may rotate freely in a housing and has an internal polygonal-shaped through orifice along the whole of its longitudinal axis, which may be connected with the polygonal section of the free ends of the two portions of rotating cable, without possibility of relative rotation therebetween, and is preferably of a rectangular cross-section.

The cylindrical body having a polygonal longitudinal section houses both ends of the two portions of rotating cable considered here, so that they are relatively immobilized for the purpose of transmitting the turning moment adequately. In the same way, the materials forming this cylindrical body and the movable adjustment core containing the cylindrical body, have a friction therebetween of appropriate low value to allow the cylindrical body to rotate without causing misfunctioning of the device of the invention.

The adjustable splicing device of the invention is also characterized in that the splicing terminal is essentially cylindrical, is made from material appropriate for the intended use and purpose, preferably plastic material or the like, and is provided with fixing tabs having retaining teeth which may engage in the external annular channel of the movable adjustment core; and with a center through internal orifice along the whole of its longitudinal axis through the rear end of which there is inserted the free end of the portion of rotating cable other than the portion penetrating in the movable adjustment core and in whose opposite end, that is the front end, there is formed a housing to receive the end portion of the front part of the movable adjustment core.

The inner through orifice of the splicing terminal preferably comprises three portions or sections of different diameters for the following purpose: the rear portion through which the corresponding portion of the rotating cable penetrates, limits the insertion of the portion of rotating cable in the splicing terminal itself, since the plane formed by the change of section passing from a larger to a smaller diameter, forming a step, forms the retaining seat for the rotating cable sheath. The intermediate section which, as said above, is of a smaller diameter than the previous one, forms a guide and bearing zone for the sheathless portion of cable crossing through it before coupling with the connecting means. The third, or front, section situated after the second one and designed for locating the end portion of the movable adjusting core, is the one precisely containing the connecting means which receive the corresponding ends of the portions of rotating cable.

The way of using the adjustable splicing device of the invention is as follows: first the guide and protection body and the lock nut are installed in the corresponding places therefor on the connector support. Thereafter the remaining components of the adjustable splicing connector may be mounted. In the first place, the movable adjustment core containing the corresponding end of one of the rotating cable portions inserted in the connecting means for both ends of the rotating cable, is mounted on one side of the support. Thereafter, without need of having access to the side of the support cited in the first place, the splicing terminal containing the end corresponding to the other portion of rotating cable is mounted on the other side of the support. Once the engagement teeth of the fixing lugs of the said splicing terminal are engaged in the annular channel of the movable adjustment core, this core may be slid along the inside of the guide and protection body over an appropriate distance to optimize the length of the two portions of rotating cable situated on one side and the other of the partition-like support. Once these lengths have been set, a simple rotation of the lock nut around the channeled portion of the guide and protection body causes the inner retaining shoulder of the nut to slide along the angularly extending slot until it reaches the retaining means situated at the end of the path, fixing in this way the terminal position of the lock nut and, correspondingly, firmly fixing the assembly of the guide and protection body and also firmly fixing the position of the movable adjustment core because of the engagement effect between the segmented internal engaging thread of the lock nut and the segmented external engaging thread of the movable adjustment core which positionally coincide with the rotation direction.

The angular geometry of the slot along which the inner shoulder of the lock nut slides, causes the latter to approach the wall forming the support of the device according to the invention and press thereagainst. In this way there is a pressure against both sides of the support due to the action of the face corresponding to the nut and to the tightening projection of the guide and protection body, to compensate the possible thickness variations that the support material may have.

Since from the time when the splicing terminal has been assembled by engaging it in the annular channel of the movable adjustment core, the function of the external annular rib of the guide and protection body is no longer used or is necessary and, due to the pressing action of the lock nut, the rib is housed in the inner circular channel formed in the latter, thereby preventing it from becoming a hindrance to obtaining a tight connection.

BRIEF DESCRIPTION OF THE DRAWINGS

FIG. 1 shows cross-sectional view of elements of the splicing device of the invention;

FIG. 2 is a cross-sectional view along the line II—II of FIG. 1;

FIG. 3 is a cross-sectional view along the line III—III of FIG. 1;

FIGS. 4, 5 and 6 are partial views of the splicing device of the invention;

FIG. 7 is a partial sectional view of the splicing device of the invention;

FIGS. 7a and 7b are views showing a perspective view and a end view of an end portion of a rotating cable of the splicing device;

FIG. 8 is a longitudinal cross-sectional view of the splicing device of the invention;

DETAILED DESCRIPTION OF THE PREFERRED EMBODIMENT

Figure 9:
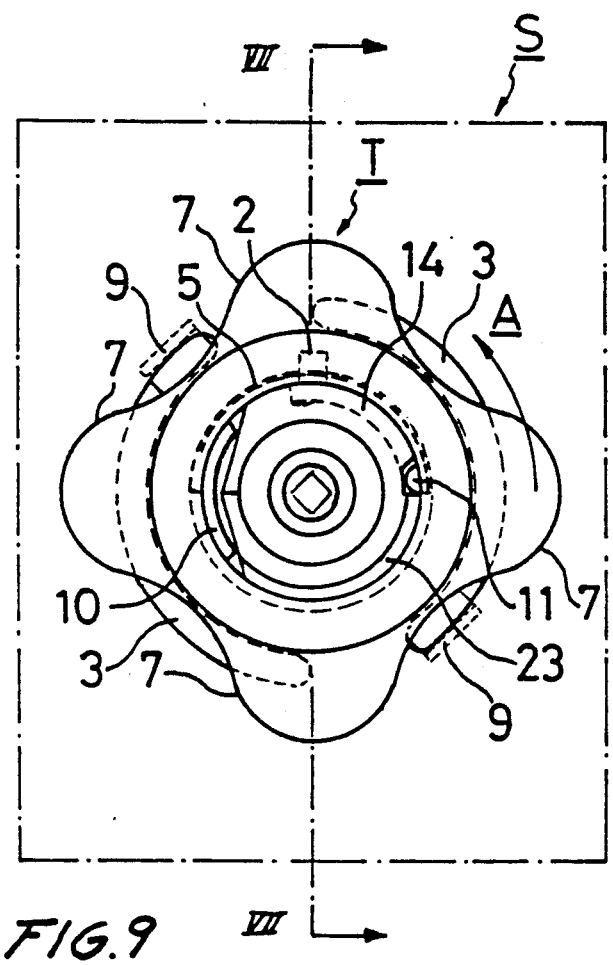
FIG. 9 is a partial front view of the splicing device of the invention.

The adjustable splicing device of the invention which as an example of embodiment has been shown in the accompanying drawings is formed by a adjustable splicing connector associated with a partition-like support S attached to the vehicle structure.

The support S which is preferably made of sheet metal, has a through orifice 1 of circular cross-section, a positioning notch 2, and two curved slots 3 having the same radius of curvature and being concentric around the through orifice 1, as shown in FIG. 5 of the drawings.

The through orifice 1 of the support S corresponds dimensionally to the external surface of the guide and protection body CG and the two curved slots 3 of the support S mate with the engagement means of the lock nut T.

In this way, the positioning notch 2 and both curved slots 3 of the support S contribute to retaining of the guide and protection body CG and the lock nut T firmly in position.

The lock nut T, made in this embodiment from a plastic material, has four manual tightening lugs 7 arranged around the perimeter thereof, as shown in FIG. 6 of the drawings, allowing the operator to carry out the operations of the lock nut T when assembling the device of the invention.

The lock nut T is also provided with two fixing and pressure lugs 8 having corresponding teeth 9. The two fixing and pressure lugs 8 may be housed in the corresponding curved slots 3 of the support S, and the teeth 9 hold the lock nut T firmly in position in the support S while allowing it to rotate an angular distance determined by the length between the corresponding ends of the slots 3.

The lock nut T is also provided with a segmented internal engagement thread 10, an inner retaining shoulder 11, and an inner circular channel 12.

The guide and protection body CG, made of a plastic material, is provided with a positioning projection 4 and an external segmental annular rib 5. The purpose of the former is to prevent rotation of the guide and protection body CG, and the purpose of the latter is to hold the guide and the protection body CG firmly in position during the intermediate assembly operations prior to fitting of the splicing terminal TE.

The guide and protection body CG is also provided with a tightening flange 13 and a channelled portion 6 having a guide groove 14 the section of which corresponds to the inner retaining shoulder 11 of the lock nut T and extends a sufficient angular distance, as shown in FIG. 4 of the drawings, and a retaining cavity 15 in which the inner retaining shoulder 11 may be housed in the final or locked position of the splicing connector CE.

The movable adjustment core ND made from a plastic material, is provided with a center through inner orifice extending along its whole longitudinal axis as shown in FIG. 1 of the drawings and through the rear end of which there is inserted the free end 17' of the portion 17 of rotating cable from the speedometer, and in the opposite end of which there is formed a housing 19 for receiving the free ends 17' and 21' of the portions 17 and 21 of the rotating cable, as shown in FIGS. 7 and 8 of the drawings.

The inner through orifice of the movable adjustment core ND has three sections of different diameters for the following purpose: the rear section 16, in which the free end 17' of the portion 17 of rotating cable is inserted, limits the entry of the portion 17 of rotating cable to the interior of the moving core ND since the plane formed by the intermediate section 18, which is of smaller diameter, forms the retaining seat of the sheath of the portion 17 of rotating cable. Through the intermediate section 18 there extends the sheathless portion 17 of rotating cable. The front section 19 has an appropriate shape and dimensions to house the cylindrical splicing body 20 which connects the free ends of the two portions 17 and 21 of the rotating cable.

The moving adjustment core ND is also provided with a segmented outer engaging thread 23, the length of which corresponds with the range of adjustment allowed by the device and which is mechanically complemented, to be able to block itself therewith, with the segmented inner engaging thread 10 of the lock nut T. The adjustment core [ND] has an external annular channel 24 for retaining the splicing terminal TE mounted on the free end of the portion 21 of the rotating cable.

The cylindrical splicing body 20 made from a plastic material, is provided with a through orifice 22 of a rectangular cross-section engageable with the rectangular cross-section of the free ends 17' and 21' of the respective portions 17 and 21 of the rotating cable, as shown in FIG. 7 and 8 of the drawings.

This prevents relative rotation between both portions 17 and 21 of the rotating cable and the turning moment is adequately transmitted. Likewise, the friction between the materials forming the movable adjustment core ND and the cylindrical splicing body 20, which are preferably made of plastic materials, is low, whereby a faulty operation of the device of the invention is avoided.

The splicing terminal TE has two fixing lugs 25 provided with the corresponding teeth 26 which may engage the external annular channel 24 of the movable adjustment core ND.

The splicing terminal TE is also provided with a center through internal orifice 29 extending all along the whole longitudinal axis thereof, as shown in FIG. 1 of the drawings, through the rear end of which the free end 21' of the portion 21 of rotating cable is inserted, and in the front end of which there is formed a housing 30 for receiving the end portion 27 formed on the front part of the movable adjustment core ND, as shown in FIGS. 7 and 8 of the drawings.

The center through internal orifice of the splicing terminal TE comprises three sections of different diameter for the following purpose: the rear section 28, through which the free end 21' of the portion 21 of rotating cable is inserted, limits the insertion of this portion 21 of rotating cable in the interior of the splicing terminal TE since the plane formed by the intermediate section 29, which is of smaller diameter, forms the retaining seat of the sheath of the portion 21 of rotating cable. Through the intermediate section 29, there passes the sheathless portion 21 of rotating cable. The front section 30 has a shape and dimensions for receiving the end portion 27 formed on the front part of the movable adjustment core ND.

The assembly of the components of this embodiment of the adjustment splicing device of the invention is effected in the first place by inserting the channelled portion 6 of the guide and protection body CG in the through orifice 1 of the support S such that the positioning projection 4 of the body CG is located in the positioning notch 2 of the support S. Likewise the lock nut T is mounted on the support S by inserting the fixing and pressure lugs 8 of the lock nut T in the corresponding curved slots 3 of the support S.

On the vehicle dashboard side of the support S, the free end 17' of the portion 17 of the rotating cable is inserted through the inner through orifice of the moving adjustment core ND, inside the cylindrical splicing body 20 which is located in the rear section 19 of the movable adjustment core ND where it is held firmly in place by appropriate means.

By inserting the movable adjustment core ND duly positioned through the guide and protection body CG, as shown in FIG. 7 of the drawings, the external annular rib 5 of the body CG becomes operative conferring an appropriate positional stability preventing the unit thus formed, from moving backwards and coming out of the through orifice 1 of the support S and falling behind it.

In FIGS. 1, 3, and 4, the external annular rib 5 of the guide and protection body CG is formed by a small shoulder bow-shaped lodged on the external area of the channelled portion 6. During the first step of the assembly, the body CG is inserted in the orifice 1 of the support S, so that the edge of this orifice 1 is situated between the flange 13—which acts as a butt- and the rib 5. As the channelled portion 6 is empty in its center, during the first step of the assembly, the body naturally tends to drop since its perimeter is half the perimeter of said orifice 1. Following with the assembly, the movable adjustment core ND is then introduced into the body CG, all along its inner part, filling the empty and channelled portion 6, in such a way that the outer area of that channelled portion 6 presses against the inner face of the edge of the orifice 1. At that moment, the external annular rib 5, which is wider in diameter than the orifice 1, becomes a barrier intended to avoid the embodiment formed by the two components mentioned before,—that is the body CG and the adjustment core ND—from moving backwards spontaneously and detaching from the orifice 1 of the support S.

On the other side of the support S without need of the access to the side of the support S mentioned in the first place, the splicing terminal TE containing the end corresponding to the portion 21 of rotating cable, is mounted as shown in FIG. 7 of the drawings. When the teeth 26 of the fixing tabs 25 of the splicing terminal TE are lodged in the annular channel 24 of the movable adjustment core ND and the free end 21' of the portion 21 of the rotating cable is simultaneously inserted in the cylindrical splicing body 20 where it is retained, the movable adjustment core ND may slide in either direction D or I along the inside of the guide and protection body CG to optimize the lengths of both portions 17 and 21 of rotating cable on both sides of the partition-like support S, thereby avoiding excessive undulations or harmful mechanical tensions for the portions of the rotating cable.

Figure 10:
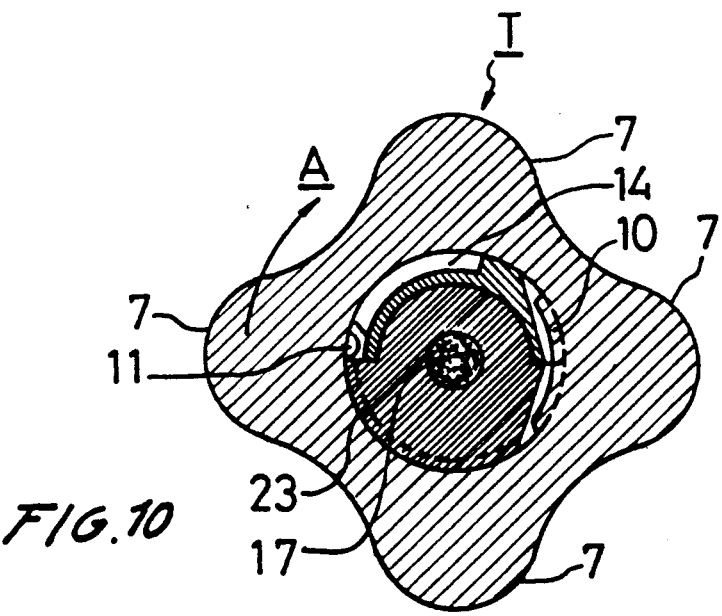
FIG. 10, is a cross-sectional view along the line X—X of FIG. 7.
Figure 11:
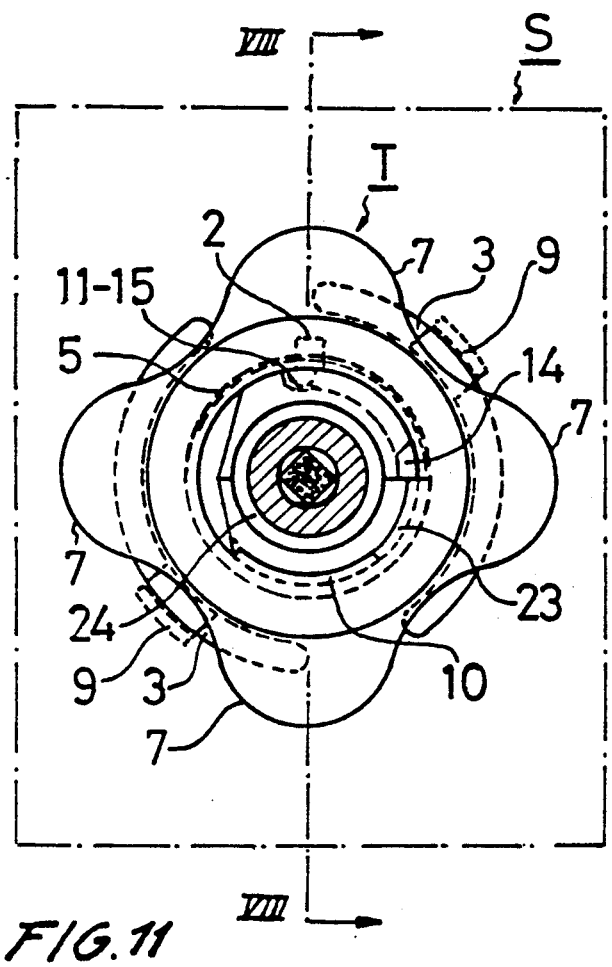
FIG. 11 is a cross-sectional view along the line XI—XI of FIG. 8.
Figure 12:
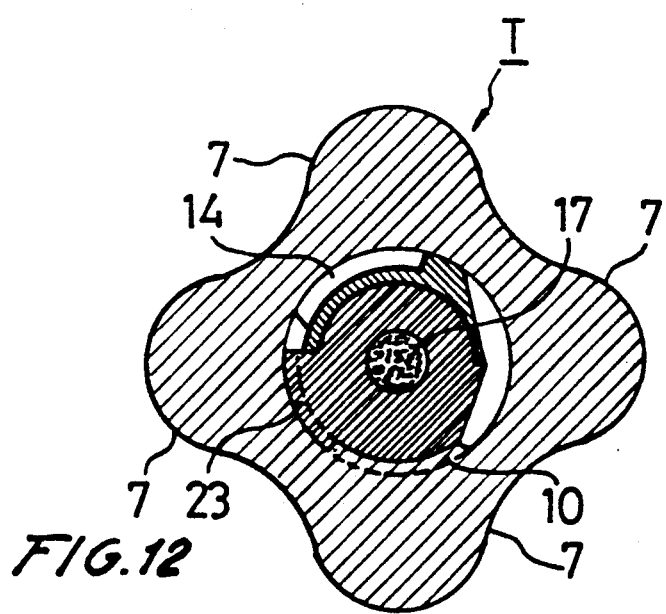
FIG. 12 is a cross-sectional view along the line XII—XII of FIG. 8.

Once the lengths of both portions 17 and 21 of rotating cable have been determined on both sides of the support S, a twist of the lock nut T, in the direction A as shown in FIGS. 9 and 10, causes the inner retaining shoulder 11 of the lock nut T to slide along the guide groove 14 until it reaches the retaining cavity 15 disposed on the channelled portion 6 of the guide and protection body CG. The rotation in the direction A of the lock nut T also causes the segmented inner engagement thread 10 of the lock nut T and the segmented external engaging thread 23 of the movable adjustment core ND to become engaged as shown in FIGS. 8, 11 and 12 of the drawings.

In this way, the terminal position of the lock nut T is set, with the guide and protection body CG being firmly attached to the support S. Also the position of the movable adjustment core ND as determined in the above described operations, is also firmly set.

The angular disposition of the guide groove 14 situated on the channelled portion 6 of the guide and protection body CG, shown in FIG. 4, causes the lock nut T to exert pressure against both sides of the support S due to the action of the corresponding surface of the nut and of the pressure flange 13 of the guide and protection body CG when the inner retaining shoulder 11 slides along the guide groove 14, thereby compensating for the possible variations of thickness of the material forming the support S.

The external annular rib 5 of the guide and protection body CG, which ceases to be operative from the time when the splicing terminal TE is engaged in the movable adjustment core ND, is retained in the circular inner channel 12 of the lock nut T thereby preventing it from becoming an obstacle hindering tightening up of the adjustable splicing connector CE with the support S.

In the majority of tests carried out by the inventors the adjustable splicing device of the invention has been mounted in such a way that the portion 17 of the rotating cable extended from the speedometer, and the portion 21 of the rotating cable extended from the vehicle gearbox, with excellent operating results being obtained. But the tests have also been carried out with assembling the other way around, that is with the portion 17 of rotating cable extending from the gearbox and the portion 21 of rotating cable extending from the speedometer, with very good results.

What is claimed is:

1. An adjustable splicing device for mechanically connecting two portions of a rotating cable, comprising a guide and protection body to be attached to a partition-like support, an adjustment core for receiving free ends of the portions of the rotating cable and telescopically movable in said guide and protection body; a lock nut for securing said adjustment core in a predetermined position in said guide and protection body; connecting means for rotatably connecting the free ends of the two portions of the rotating cable in said adjustment core; and a splicing terminal for retaining said connecting means in said adjustment core.

2. An adjustable splicing device according to claim 1, wherein the support is made from a sheet-like material and has a substantially circular through orifice having a diameter and provided with a positioning notch, and two curved slots concentric with the circular through orifice and having a same radius of curvature and opposite ends with ends of one slot being spaced a relatively short distance from respective ends of another slot, said guide and protection body having an outer diameter corresponding to the diameter of the circular through orifice, and said lock nut including engaging means mating with said curved slots.

3. An adjustable splicing device according to claim 1, wherein said lock nut includes hand-tightening means; a segmented inner engaging thread; an inner retaining shoulder; two fixing and pressure lugs provided with teeth; and an inner circular channel, said inner circular channel and said fixing and pressure lugs being disposed a relatively short distance from one of two opposite ends of said lock nut.

4. An adjustable splicing device according to claim 3, wherein said guide and protection body includes a positioning projection for preventing rotation of said guide and protection body in the support; an external segmental annular rib for retaining said guide and protection body in the support in a predetermined position of said guide and protection body during an intermediate operation; a tightening flange; and a channeled portion having guiding and retaining means for said inner retaining shoulder of said lock nut.

5. An adjustable splicing device according to claim 4, wherein said guiding and retaining means comprises a groove formed on the outer surface of said channeled portion and extending a predetermined angular distance thereon, and means for fixedly retaining said inner retaining shoulder in a locked position of said splicing device.

6. An adjustable splicing device according to claim 3, wherein said adjustment core is substantially cylindrical and has a center through orifice extending along an entire length of said adjustment core and having a first end for insertion of a free end of one of the two portions of the rotating cable and a second end defining a housing for receiving said connecting means, said adjustment core further including a segmented external engaging thread having a length corresponding to a range of length adjustment of said adjustable splicing device and cooperating with said segmented inner engaging thread of said lock nut, an external annular channel for retaining said splicing terminal.

7. An adjustable splicing device according to claim 6, wherein said connecting means is formed as a cylindrical splicing body rotatable in said housing and having a through inner orifice having a polygonal cross-section for receiving the free ends of the two portions of the rotating cable which also have a polygonal cross-section, so that relative rotation of said connecting means and the free ends is prevented.

8. An adjustable splicing device according to claim 7, wherein said splicing terminal is essentially cylindrical and comprises fixing lugs having teeth for engaging said external annular channel of said movable adjustment core and an inner through orifice extending along an entire length of said splicing terminal and having a first end for insertion of a free end of another of the two portions of the rotating cable and a second end defining a housing for receiving said second end of said adjustment core.

* * * * *